US008539449B2

(12) United States Patent
Kim et al.

(10) Patent No.: US 8,539,449 B2
(45) Date of Patent: Sep. 17, 2013

(54) DEVICE AND METHOD FOR INSPECTING SOFTWARE FOR VULNERABILITIES

(75) Inventors: Eun Young Kim, Daejeon (KR); Young Tae Yun, Daejeon (KR); Eung Ki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1141 days.

(21) Appl. No.: 12/102,148

(22) Filed: Apr. 14, 2008

(65) Prior Publication Data
US 2009/0119647 A1   May 7, 2009

(30) Foreign Application Priority Data
Nov. 1, 2007   (KR) .................. 10-2007-0110850

(51) Int. Cl.
G06F 9/44       (2006.01)
G06F 11/00      (2006.01)

(52) U.S. Cl.
USPC ............................... 717/126; 714/38.1

(58) Field of Classification Search
USPC ........................... 717/126; 714/38.1
See application file for complete search history.

(56) References Cited

U.S. PATENT DOCUMENTS

| 7,051,322 | B2 | 5/2006 | Rioux |
| 7,594,142 | B1* | 9/2009 | O'Leary et al. ............ 714/38.11 |
| 7,844,953 | B2* | 11/2010 | Morizawa et al. ............ 717/126 |
| 7,904,963 | B2* | 3/2011 | Kraft et al. ...................... 726/25 |
| 7,926,114 | B2* | 4/2011 | Neystadt et al. ................ 726/25 |
| 2004/0181713 | A1 | 9/2004 | Lambert |
| 2006/0090206 | A1* | 4/2006 | Ladner et al. .................... 726/25 |
| 2007/0203973 | A1 | 8/2007 | Landauer et al. |
| 2008/0047013 | A1* | 2/2008 | Claudatos et al. .............. 726/24 |
| 2008/0195676 | A1* | 8/2008 | Lyon et al. ..................... 707/204 |
| 2008/0288822 | A1* | 11/2008 | Wu et al. .......................... 714/32 |
| 2009/0007077 | A1* | 1/2009 | Musuvathi et al. ........... 717/130 |
| 2009/0077664 | A1* | 3/2009 | Hsu et al. ........................ 726/24 |

FOREIGN PATENT DOCUMENTS

| JP | 07-036688 A | 2/1995 |
| KR | 1020070092403 A | 9/2007 |

OTHER PUBLICATIONS

Howard et al., "Violating Assumptions with Fuzzing," IEEE, 2005, 5pg.*

(Continued)

*Primary Examiner* — Li B Zhen
*Assistant Examiner* — Ryan Coyer
(74) *Attorney, Agent, or Firm* — Ladas & Parry LLP

(57) ABSTRACT

Provided is a device and method for inspecting software for vulnerabilities which fuzzes the software by function. The device for inspecting software for vulnerabilities includes a target function selecting module for selecting a function of the software for vulnerabilities to be inspected, a comparison file generating module for generating a first file including the selected function and a second file not including the selected function, a binary pattern comparing module for detecting a changed or added binary pattern by comparing binary values of the first file and the second file, a test case generating module for generating at least one test case based on the detected binary pattern, and a vulnerability verifying module for inspecting vulnerabilities based on the at least one test case and generating a vulnerability inspection result. Accordingly, by intensively fuzzing a part of the software which is changed or added according to the function of the software, software vulnerabilities can be found by each function and fuzzing efficiency can be improved.

13 Claims, 5 Drawing Sheets

(56) References Cited

OTHER PUBLICATIONS

Ilja van Sprundel; "Fuzzing: Breaking software in an automated fashion", events.ccc.de/congress/2005/fahrplan/attachments/582-paper_fuzzing.pdf, Dec. 8, 2005, pp. 1-5.

Yue Caisong, et al; "Detection of MS Office Vulnerabilities Based on Fuzz Test", China Academic Journal Electronic Publishing House, http://cnki.net, Information Safety and Communication Secrecy, pp. 111-113, Sep. 2007 (Exact Date Not Given).

Michael Sutton et al; "Fuzzing: Brute Force Vulnerability Discovery", © 2007 Pearson Education, Inc., Printed in the United States of America, First Printing, Jun. 2007, XP002659480, 11 pages from book.

Jared D. Demott, et al; "Revolutionizing the Field of Grey-box Attack Surface Testing with Evolutionary Fuzzing", XP-002573212; Accepted for publication at Black Hat and DEFCON 2007, 25 pages.

Timo Mantere; Automatic Software Testing by Genetic Algorithms, Acta Wasaensia, No. 112, Computer Science 3, Universitas Wasaensis 2003, XP-002573211, 151 pages.

* cited by examiner

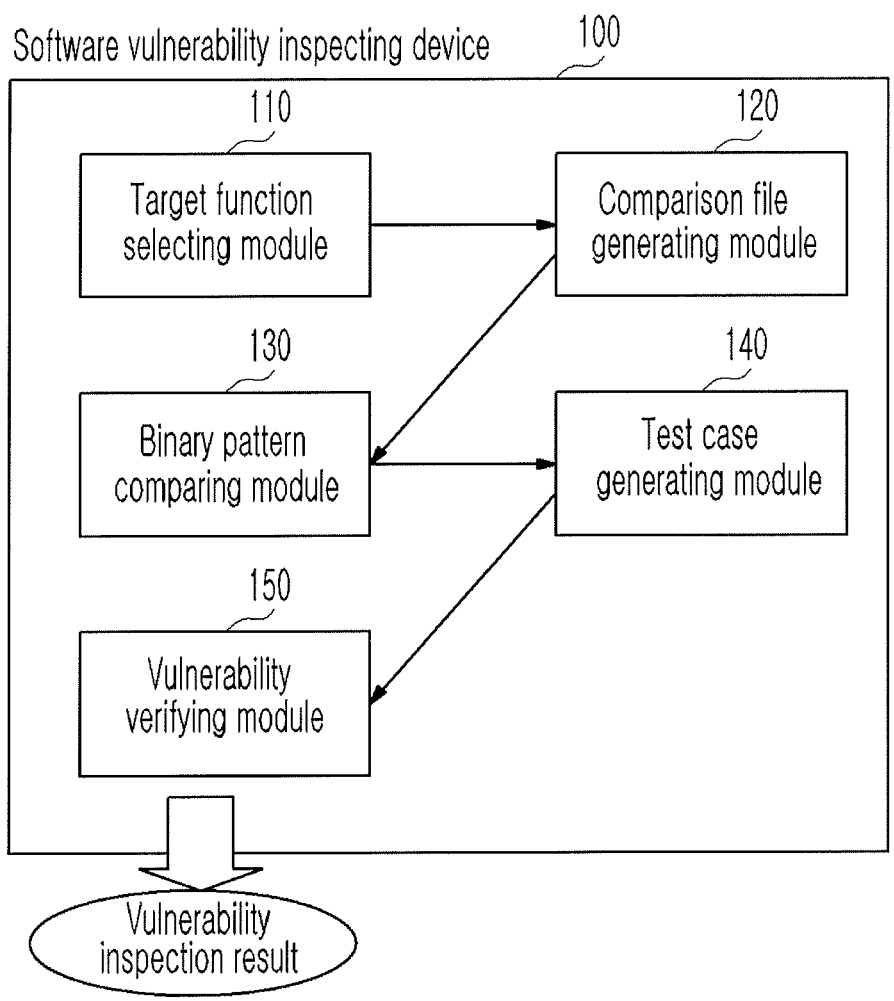

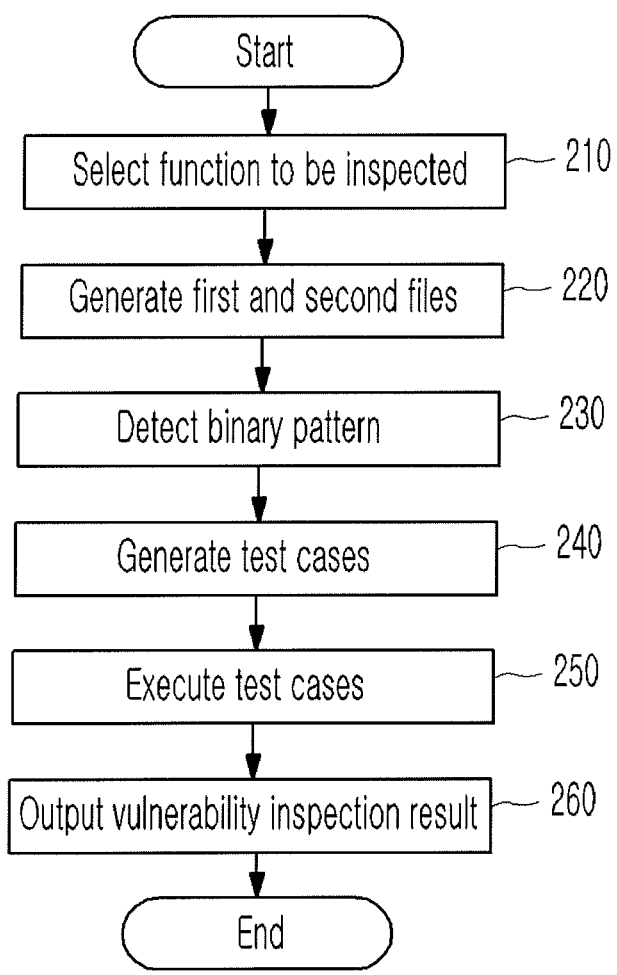

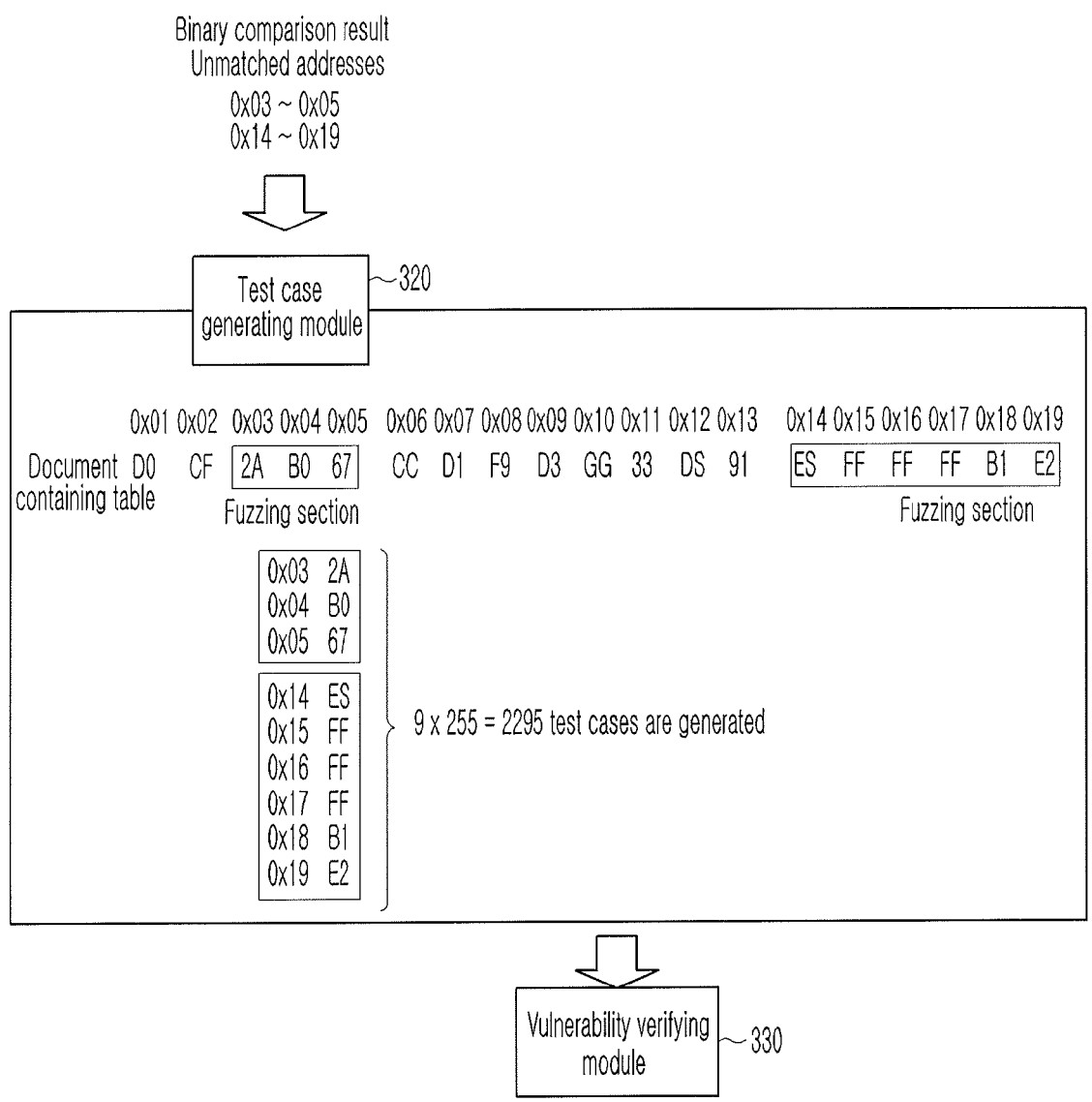

DEVICE AND METHOD FOR INSPECTING SOFTWARE FOR VULNERABILITIES

CROSS-REFERENCE TO RELATED APPLICATION

This application claims priority to and the benefit of Korean Patent Application No. 2007-110850, filed Nov. 1, 2007, the disclosure of which is incorporated herein by reference in its entirety.

BACKGROUND

1. Field of the Invention

The present invention relates to a device and method for inspecting software for vulnerabilities, and more particularly, to a device and method for inspecting software for vulnerabilities that performs fuzzing for specific functions of the software.

2. Discussion of Related Art

In a process of developing software, analysis of the software is generally performed by setting a break point at a part of source code likely to have vulnerability using a debugging program, and observing an execution environment of the software when the executed software stops at the break point.

On the other hand, since software vulnerability analysis is generally performed in an environment where a source code cannot be obtained, vulnerability of the software is analyzed in a black box test method which can be performed only with an executable file. Here, a black box test is a test method in which the software itself is regarded as a black box whose inner operation cannot be observed directly but can be analyzed based on input/output values of the software.

Fuzzing, one such black box test method, is an analysis method used to find defects of software in processing an input by inputting a variety of random data to the software and looking for abnormal operation. Fuzzing is generally performed by making a test case including random data, sequentially executing the test case by software, and analyzing any malfunction of the software.

A conventional method for inspecting software for vulnerabilities using such fuzzing randomly generates and analyzes data from regardless of the function of the software. Thus, this method does not enable intensive inspection for vulnerabilities in specific functions of the software.

SUMMARY OF THE INVENTION

The present invention is directed to a device and method for inspecting software for vulnerabilities which can intensively fuzz the software by function.

One aspect of the present invention provides a device for inspecting software for vulnerabilities, including: a target function selecting module for selecting a function of the software for vulnerabilities to be inspected; a comparison file generating module for generating a first file including the selected function and a second file not including the selected function; a binary pattern comparing module for detecting a changed or added binary pattern by comparing binary values of the first file and the second file; a test case generating module for generating at least one test case based on the detected binary pattern; and a vulnerability verifying module for inspecting vulnerabilities based on the at least one test case and generating a vulnerability inspection result.

Another aspect of the present invention provides a method for inspecting software for vulnerabilities, including: selecting a function of the software for vulnerabilities to be inspected; generating a first file including the selected function; generating a second file not including the selected function; comparing binary values of the first file and the second file to detect a changed or added binary pattern; generating at least one test case based on the detected binary pattern; performing vulnerability inspection based on the at least one test case; and outputting a result of the vulnerability inspection.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 1 is a block diagram illustrating a configuration of a software vulnerability inspecting device according to an exemplary embodiment of the present invention;

FIG. 2 is a flowchart illustrating a method for inspecting software for vulnerabilities according to an exemplary embodiment of the present invention; and FIGS. 3A to 3C are diagrams illustrating operations of modules included in a software vulnerability inspecting device according to an exemplary embodiment of the present invention.

DETAILED DESCRIPTION OF EXEMPLARY EMBODIMENTS

Figure 3A:
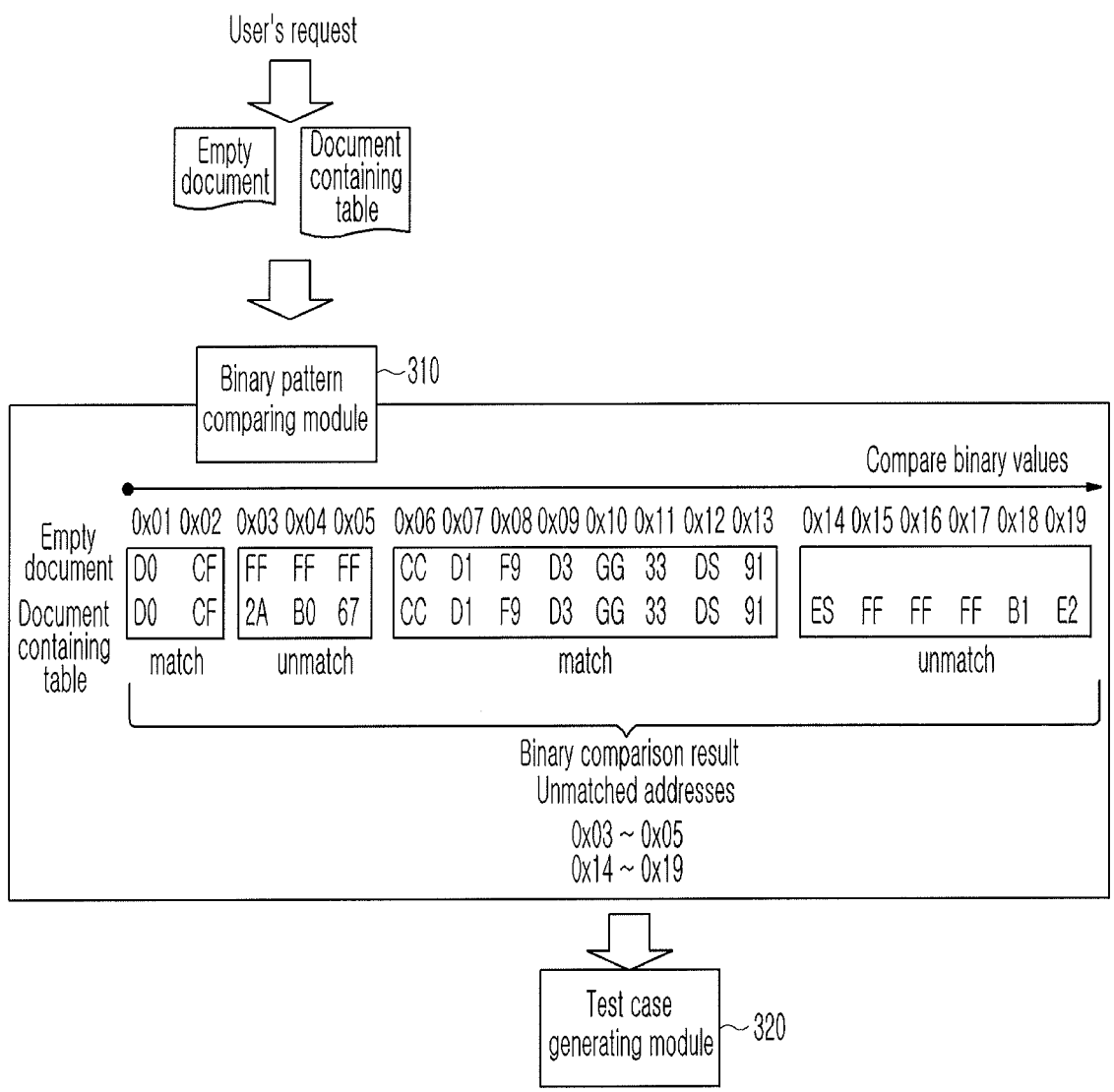

The foregoing and other objects, features and advantages of the invention will be apparent from the following more particular description of exemplary embodiments of the invention, as illustrated in the accompanying drawings.

FIG. 1 is a block diagram illustrating a configuration of a software vulnerability inspecting device according to an exemplary embodiment of the present invention.

Referring to FIG. 1, a software vulnerability inspecting device 100 includes a target function selecting module 110 for selecting a function for inspection, a comparison file generating module 120, a binary pattern comparing module 130, a test case generating module 140 and a vulnerability verifying module 150.

The target function selecting module 110 selects a function to be intensively fuzzed from among all functions of the inspected software. The comparison file generating module 120 generates a first file including the selected function and a second file not including the selected function.

The binary pattern comparing module 130 detects binary patterns which are different from one another by comparing binary values of the first and second files. Here, a binary pattern refers to as a set of values comprising a series of binary values. The difference between the binary patterns of the first and second files depends on whether or not to include a specific function, so an address of the binary pattern different from one another means an address of the file data corresponding to the specific function. The test case generating module 140 generates a test case to perform fuzzing based on a part detected by the binary pattern comparing module 130. The vulnerability verifying module 150 executes the inspected software using the test case generated by the test case generating module 140, generates and outputs a vulnerability inspection result based on whether or not there is a malfunction occurring during execution of the software.

FIG. 2 is a flowchart illustrating a method of inspecting software for vulnerabilities according to an exemplary embodiment of the present invention.

Referring to FIG. 2, a function selecting module selects a function of software to be inspected (S210). In one embodiment, the target function selecting module may select a function to be inspected according to a user's input through a user interface, or according to a predefined selection algorithm without a user's input.

A comparison file generating module generates a first file including the selected function to be inspected, and a second file not having the selected function to be compared with the first file (S220). In one embodiment, the second file may be an initialized file generated by the software, such as an empty document of a word processor.

A binary pattern comparing module detects a changed or added binary pattern by comparing binary values of the first and second files (S230). The binary pattern comparing module may transmit location information including an address of the part of the first file which has been detected by the comparison to a test case generating module.

The test case generating module generates a test case for performing fuzzing by inputting random data to the address of the detected part (S240). Generally, a binary value composed of two digits of hexadecimal may be input to one address. Therefore, 255 random data made by subtracting an original data value from 256 (16×16) data may be input to one address. Accordingly, when a total of N addresses are found to not match, N×255 number of test cases may be generated. In one embodiment, the test case generating module may generate test cases by sequentially substituting binary values other than the original binary value at the address of the detected part.

A vulnerability verifying module executes the inspected software using the generated test case as input data, and outputs a vulnerability inspection result based on whether or not there is a malfunction of the software during execution (S260).

Figure 3C:
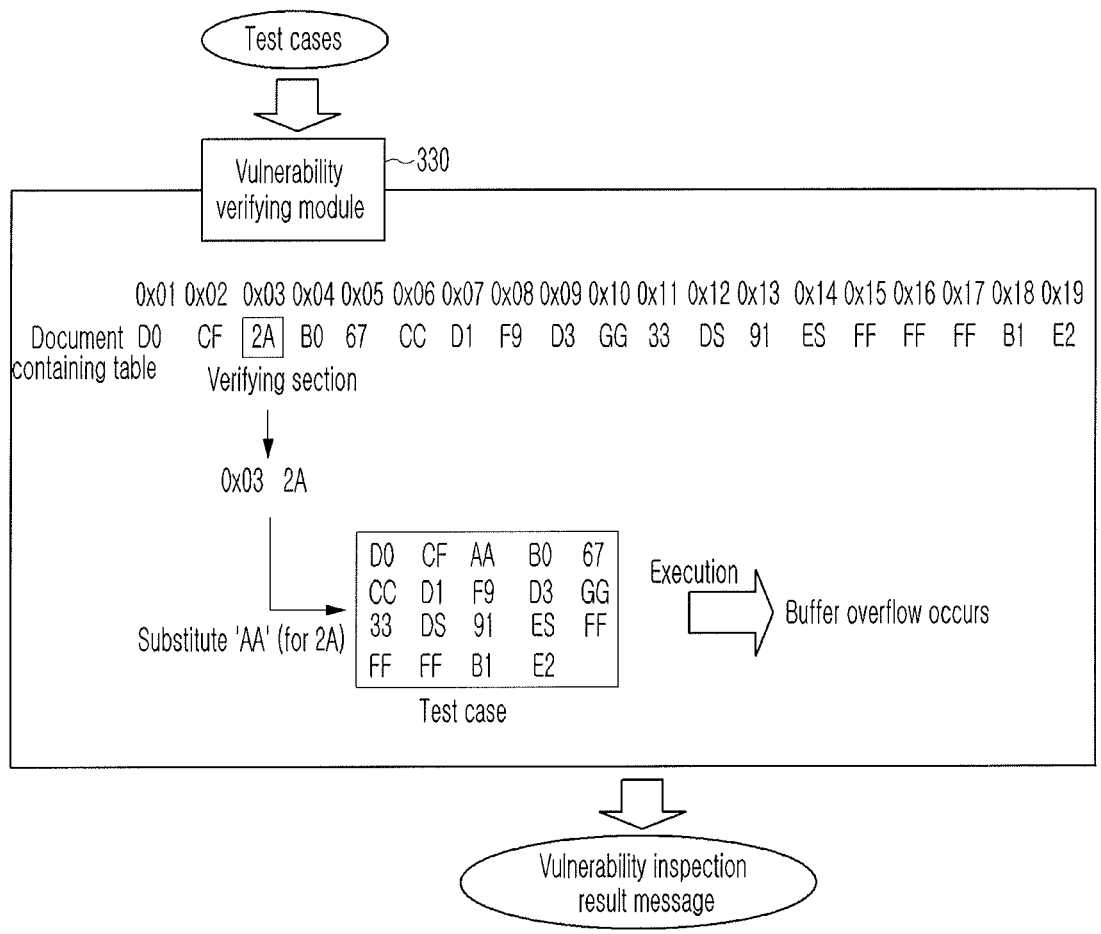

FIGS. 3A to 3C are diagrams illustrating operations of modules included in a software vulnerability inspecting device according to an exemplary embodiment of the present invention.

Referring to FIG. 3A, when a user requests a function selecting module to inspect a table drawing function of Microsoft Word for vulnerabilities, a comparison file generating module may generate a document file containing a table and an empty document file as first and second files, respectively.

A binary pattern comparing module 310 may detect changed or added binary values by sequentially comparing binary values of the empty document file and document file containing a table. For example, when the binary value of the empty document file is "D0 CF FF FF FF CC D1 F9 D3 GG 33 DS 91", and the binary value of the document file containing a table is "D0 CF 2A B0 67 CC D1 F9 D3 GG 33 DS 91 ES FF FF FF B1 E2," at 0x01 and 0x02, the two binary values match, but at 0x03 to 0x05, the two values do not match. Further, at 0x06 to 0x13, the binary values of both the files match, but at 0x14 to 0x19, only the document file containing a table has binary values. Accordingly, the binary pattern comparing module may generate location information including 0x03 to 0x05 and 0x14 to 0x19, which are addresses where the binary values of the files do not match, and transmit the information to a test case generating module 320.

Referring to FIG. 3B, the test case generating module 320 receives the location information on the addresses having unmatched binary values from the binary pattern comparing module, and inputs random data based on the received location information. For example, when 0x03 to 0x05 and 0x14 to 0x19 are transmitted to the test case generating module 320 as addresses having unmatched binary values, since 255 random data can be input to one address, the test case generating module 320 may generate 9×255=2295 number of document files as test cases and then transmit them to a vulnerability verifying module 330.

Referring to FIG. 3C, the vulnerability verifying module 330 may execute the document files generated as the test cases in Microsoft Word to verify errors probably occurring during execution, and output vulnerability inspection results. When buffer overflow occurs during execution of the document file which is generated by substituting 2A, the binary value of 0x03, for AA, the vulnerability verifying module 330 may output a vulnerability inspection result message "Buffer overflow vulnerability is found when a table drawing function of Microsoft Word is added and the binary value of 0x03 is changed into AA."

The present invention may find vulnerabilities relevant to function of software and improve fuzzing efficiency by intensively fuzzing a part of the software changed or added according to the function of the software.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device for inspecting software for vulnerabilities, comprising:
   a processor;
   a target function selecting module for selecting a function of the software for vulnerabilities to be intensively fuzzed from among all functions of the software, wherein the selection of the function is made by at least one of a user's input through a user interface and a predefined selection algorithm;
   a comparison file generating module for generating a first file comprising the selected function and a second file not comprising the selected function,
   wherein after selecting the function of the software, then generating the first file comprising the selected function;
   after generating the first file, then generating the second file not comprising the selected function,
   wherein the second file is generated immediately after the first file,
   wherein immediately after generating the first file and the second file, then generating binary values of the first file and the second file;
   a binary pattern comparing module for detecting a changed or added binary pattern by comparing the binary values of the first file and the second file, and
   wherein the first file and the second file are configured to be directly received by the binary pattern comparing module after the first file and the second file has been generated;
   a test case generating module for generating at least one test case based on the detected binary pattern; and
   a vulnerability verifying module for inspecting vulnerabilities based on the at least one test case and generating a vulnerability inspection result.

2. The device according to claim 1, wherein the binary pattern comparing module generates location information including an address of the changed or added binary pattern, and
   the test case generating module generates the at least one test case based on the location information.

3. The device according to claim 1, wherein the at least one test case is generated by sequentially substituting binary values other than an original binary value with the original binary value at the address of the changed or added binary pattern.

4. The device according to claim 1, wherein the vulnerability verifying module executes the software using the at least one test case as input data, and generates the vulnerability inspection result based on whether or not there is a malfunction of the software.

5. The device according to claim 1, wherein the second file is an initialized file generated by the software.

6. A method for inspecting software for vulnerabilities, comprising:
   selecting a function of the software for vulnerabilities to be intensively fuzzed from among all functions of the software, wherein the selection of the function is made by at least one of a user's input through a user interface and a predefined selection algorithm;
   after selecting the function of the software, then generating a first file comprising the selected function;
   after generating the first file, then generating a second file not comprising the selected function, and
   wherein the second file is generated immediately after the first file;
   immediately after generating the first file and the second file, then generating and comparing binary values of the first file and the second file to detect a changed or added binary pattern, and
   wherein the first file and the second file are compared directly after the first file and the second file has been generated;
   generating at least one test case based on the detected binary pattern;
   performing vulnerability inspection based on the at least one test case; and
   outputting a result of the vulnerability inspection.

7. The method according to claim 6, further comprising:
   after the comparing the binary values of the first file and the second file to detect the changed or added binary pattern, generating location information including an address of the changed or added binary pattern.

8. The method according to claim 7, wherein, in the generating the at least one test case based on the detected binary pattern, the at least one test case is generated based on the location information.

9. The method according to claim 6, wherein the at least one test case is generated by sequentially substituting binary values other than an original binary value with the original binary value at the address of the changed or added binary pattern.

10. The method according to claim 6, wherein, in the performing the vulnerability inspection based on the at least one test case, the software is executed using the at least one test case as input data, and the vulnerability inspection is performed based on whether or not there is a malfunction of the software.

11. The method according to claim 6, wherein the second file is an initialized file generated by the software.

12. A method for inspecting software for vulnerabilities, comprising:
   selecting a function of the software to be intensively fuzzed from among all functions of the software, wherein the selection of the function is made by at least one of a user's input through a user interface and a predefined selection algorithm;
   after selecting the function of the software, then generating a first file comprising the selected function;
   after generating the first file, then generating a second file not comprising the selected function, and
   wherein the second file is generated immediately after the first file,
   wherein the first file is at least a document file containing at least a table, and
   wherein the second file is at least a document file without containing the table;
   immediately after generating the first file and the second file, then generating and comparing binary values of the first file and the second file to detect a changed or added binary pattern, generating location information including an address of the changed or added binary pattern, and
   wherein the first file and the second file are compared directly after the first file and the second file has been generated;
   generating at least one test case based on the detected binary pattern, wherein the at least one test case is generated based on the location information;
   performing vulnerability inspection based on the at least one test case; and
   outputting a result of the vulnerability inspection.

13. The method according to claim 12, wherein the first file is a document file containing the table and the second file is an empty document file.

* * * * *